(12) United States Patent
Tu

(10) Patent No.: US 6,773,942 B2
(45) Date of Patent: Aug. 10, 2004

(54) METHOD FOR MAKING OPTICAL SWITCH ARRAY

(76) Inventor: Xiang Zheng Tu, 1293 Westwood St., Redwood City, CA (US) 94061

(*) Notice: Subject to any disclaimer, the term of this patent is extended or adjusted under 35 U.S.C. 154(b) by 0 days.

(21) Appl. No.: 10/465,761

(22) Filed: Jun. 19, 2003

(65) Prior Publication Data
US 2003/0210854 A1 Nov. 13, 2003

Related U.S. Application Data

(62) Division of application No. 09/715,237, filed on Nov. 17, 2000.

(51) Int. Cl.[7] .............................................. H01L 21/00
(52) U.S. Cl. ............................ 438/29; 438/42; 438/460
(58) Field of Search .............................. 439/16–53, 460

(56) References Cited

U.S. PATENT DOCUMENTS 5,471,552 A * 11/1995 Wuu et al. ..................... 385/49

* cited by examiner

Primary Examiner—H. Jey Tsai

(74) Attorney, Agent, or Firm—Bruce H. Johnsonbaugh (57) ABSTRACT

A method for fabricating an optical switch array comprising the steps: providing a two side polished lightly dope (110) silicon substrate; forming a heavily doped layer with a same type impurity as the (110) silicon substrate on the back side of the (110) silicon substrate; growing a lightly doped epitaxial layer on the back side of the (110) silicon substrate; converting the heavily dope layer into a porous silicon layer by anodization in HF solution; forming a plurality of micro-channels on the front side of the (110) silicon substrate so that each makes a 135 or 45 degree angle to a (111) crystal plane vertical to the surface of the (110) silicon substrate; converting the porous silicon layer into an oxidized porous silicon layer by thermal oxidization; forming electrical interconnections on the front side of the (110) silicon substrate; forming a plurality of (111) silicon planar plates each having two opposite sides made of (111) silicon crystal planes on the front side of the (110) silicon substrate by anisotropic etching; coating the two opposite surfaces of the (111) silicon planar plates with a reflection layer; removing the oxidized porous silicon by etching in a diluted HF solution to form a plurality of silicon stripes; filling said microchannels and the trenches formed in the etching process with photoresist; bonding a rigid plate to the (110) silicon substrate at the back side; and cutting the (110) silicon substrate b a dicing saw machine so that each (111) silicon planar plate and its supporting silicon strip a laterally separated from the (110) silicon substrate completely.

9 Claims, 7 Drawing Sheets

METHOD FOR MAKING OPTICAL SWITCH ARRAY

This is a division of application Ser. No. 09/715,237 filed Nov. 17, 2000.

FIELD OF THE INVENTION

This invention is related to an optical switch array, and more particularly, is related to an optical micro-electro-mechanical switch array.

BACKGROUND OF THE INVENTION

Optical switches can replace electrical switches in electro-optical systems, because of their low weight and immunity to electromagnetic interference, and because they eliminate the need for optical-to-electrical and electrical-to-optical conversion at the switch.

The importance of fiber-optic switches has been increasing due to the rapid growth of optical fiber networks. Recently, there has been a growing demand to make fiber-optic switches based on micro-electro-mechanical system (MEMS) technology. The use of MEMS techniques to make fiber-optic switches offers several advantages such as miniaturization, high performance and batch production or low cost.

Figure 1:
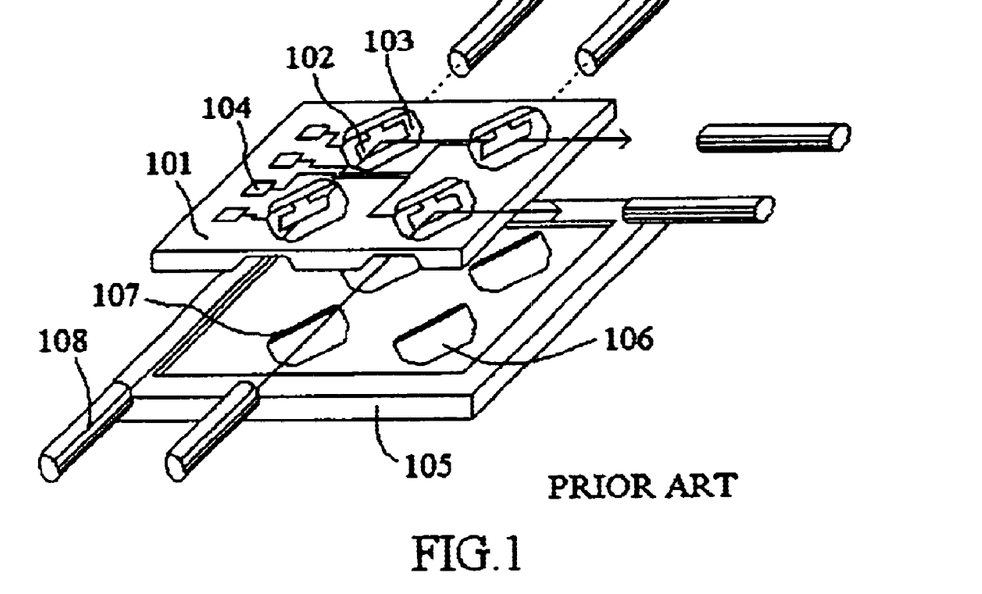
FIG. 1 is a perspective view of a conventional optical switch array.

One type of a conventional micromachined free-space optical matrix switch uses electrostatically actuated torsion mirrors, as shown in FIG. 1. The optical matrix switch includes a first base member 101, a plurality of bonding pads and interconnections 104, a second base member 105, and a plurality of optical fibers 108. The first base member 101 has an array of bores 103 formed therethrough and arranged in a plurality of columns and rows. The torsion mirror has a reflective panel member 102 and a torsion bar connected to the reflective panel member 102 by a connector section.

Each of bores 103 is sized to receive a respective one of the torsion mirrors. Each of the torsion mirrors is mounted onto the first base member by embedding opposite distal ends of the torsion bar into the first base member so that the torsion mirrors can pivot between a reflective state and a non-reflective state.

The second base member 105 includes an array of cavities 106. The first base member 101 and the second base member 105 are connected to each other with the cavities 106 disposed in a manner to receive an end portion of the reflective panel member 102 when the reflective panel member 102 is in the reflective state. A support wall 107 retains the reflective panel member 102 at an appropriate position for redirecting a beam of light traveling in a first direction to a second direction.

One problem with the optical matrix switch described above is that the insertion loss between the fibers is quite high due to a fact that there are no lenses for collimating the light between them.

Another problem is that precision alignment is required to connect the first base member and the second base member together so that the support wall is properly oriented to retain the reflective panel member properly in its reflective state.

Additionally, electrostatic torque causes the reflective panel member to move between the reflective state and the non-reflective state. Electrostatic torque is a complicated area of the art and there is limited data to determine when mechanical fatigue might be expected over the lifetime of the conventional optical matrix switch.

Figure 2:
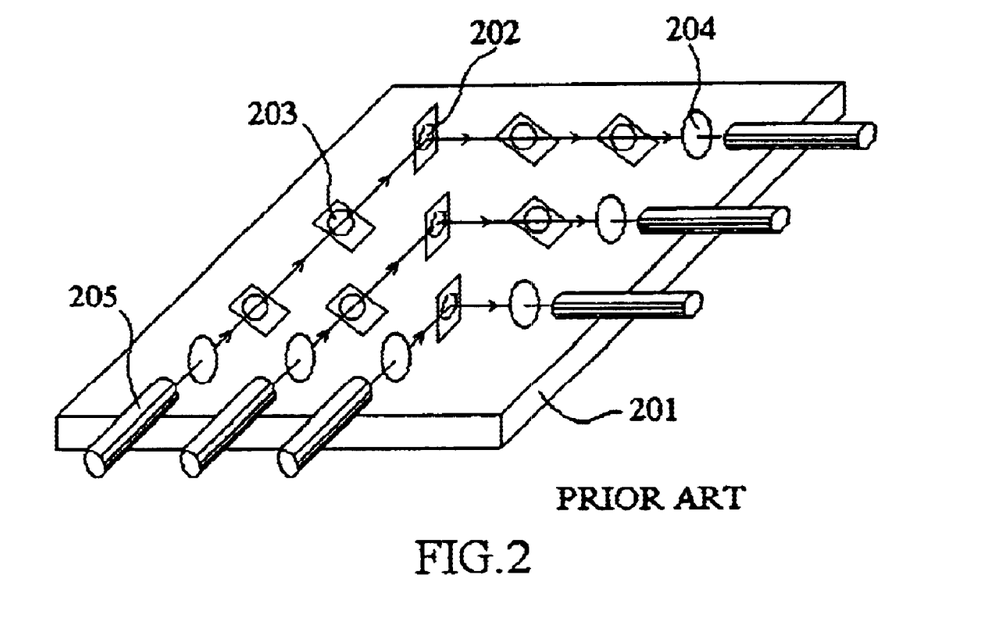
FIG. 2 is a perspective view of another conventional optical switch array.

As shown in FIG. 2, another type of a conventional micromachined free-space optical matrix switch includes a base member 201, a plurality of reflective panels 202, 203, a plurality of microlenses 204, a plurality of optical fibers 205, and an actuator. Each reflective panel is pivotally connected to the base member and is unbiasedly movable between a reflective state and a non-reflective state. The actuator is connected to the base member 201 and the reflective panels and causes the reflective panels to move between the reflective state and the non-reflective state.

Each reflective panel includes at least one hinge pin member and at least two hinge pin connecting members. A staple member having a channel sized to receive at least one hinge pin member is connected to the base member 201 with at least one hinge pin member disposed within the channel so that the reflective panel can pivotally move about a pivot axis that extends through at least one hinge pin member.

The actuator includes a hinge assembly and a translation plate. The hinge assembly has at least one connecting rod with a first end pivotally connected to the reflective panel and an opposite second end pivotally connected to the translation plate. The translation plate is slidably connected to the base member and moves between a first position and a second position.

The actuator is a scratch drive actuator mechanism or a comb drive mechanism. One of these mechanisms is connected to the translation plate and is operated in conjunction with the base member to cause the translation plate to move to and between the first and second positions.

This type of optical matrix switch does not include any microstructures for receiving optical fibers and lenses. It is impossible to realize passive alignment between the optical fibers, the mirrors and the lenses.

The optical matrix switch of FIG. 2 is fabricated using a three-layer polysilicon process that can only be offered by a few MEMS technology centers. Since the three-layer polysilicon process is still not in a definition manner, even though all the mirrors go through the same processes, they still have quite different natural frequencies.

A reflection position of the optical matrix switch is established by placing at least four separated movable components in place. Any vibration may change position of the movable components and cause the switch to go out of the reflection position.

The optical matrix switch has a mirror-to-mirror distance greater than 175 micrometers. It has been shown that the mirror-to-mirror distance more than 175 micrometers results in an insertion loss between the two mirrors greater than 2.5 dB which exceeds the allowable maximum insertion loss for practical applications.

SUMMARY OF THE INVENTION

In order to solve the aforementioned problems and other problems, an optical switch array has been developed by the present invention. The optical switch array at least possesses the following features:

The reflection mirrors of the optical switch array are self-oriented to the vertical direction of its operation plane.

The reflection mirrors and their supporting flexural strips are orthogonal to each other so that bending of the strips can be turned into the vertical movement of the mirrors.

The supporting flexural strips are formed from single crystal silicon with excellent mechanical properties.

The reflection mirrors are formed from (111) silicon crystal planes with excellent optical properties.

The reflection mirrors are double-sided mirrors to increase switching density.

The optical switch array has a plurality of microchannels capable of holding optical fibers therein and realizing passive alignment between the reflection mirrors and the optical fibers.

The optical switch array has a plurality of cylindrical lenses capable of realizing passive alignment with the optical fibers and the reflection mirrors.

With the aforementioned features, the present invention provides an optical switch array comprising a plurality of (111) silicon planar plates formed in a (110) silicon substrate, bonded by two opposite (111) crystal planes vertical to the surface of the (110) silicon substrate and arranged in columns and rows. Each (111) silicon planar plate is supported by a flexural silicon strip that is anchored to the (110) silicon substrate at least at its one side. An air gap separates each silicon strip from the (110) silicon substrate and allows the silicon strip to bend up and down. Two stop shoulders are used to guide the (111) silicon planar plate vertically moving up and down and halt the (111) silicon planar plate precisely at a lifted vertical position.

The optical switch array further comprises a plurality of microchannels formed in the (110) silicon substrate. The longitudinal axis of each microchannel is oriented to a (111) silicon crystal plate at an angle of 135 or 45 degrees so that they are parallel or orthogonal to each other.

Each microchannel holds a cylindrical lens or an optical fiber therein. The optical fiber has one end bonding a cylindrical lens thereon and the other end extending to a central office that sends out optical signals.

Each (111) silicon planar plate is aimed by four cylindrical lenses. The four cylindrical lenses are arranged in X shape so that each two adjacent cylindrical lenses are orthogonal to each other and each two opposite cylindrical lenses extend along a same line.

When the optical switch array is in a non-reflective position, the (111) silicon planar plate hides or retracts into the (110) silicon substrate so that its top level aligns with the surface of the (110) silicon substrate. When a light beam comes out from a cylindrical lens that faces a (111) silicon planar plate it can travel over the (111) silicon planar plate and enter an opposite cylindrical lens without any blockade between them.

The optical switch array can be electrically driven into a reflective position. To do this, each individual silicon strip is configured to be a conductive plate of a plate capacitor. When a dc voltage is applied to the plate capacitor, the silicon strip is electrically bent up until it travels through the air gap and halts at the above stop shoulders. Consequently, the (111) silicon planar plate supported by the silicon strip is lifted out of the (110) silicon substrate so that its top portion blocks the optical travelling path between the two adjacent cylindrical lenses. When a light beam comes from a cylindrical lens, it can be reflected by the (111) silicon planar plate and go to another cylindrical lens that is oriented to the cylindrical lens at an angle of 90 degrees.

The cylindrical lenses are made of graded index fibers that have a core refractive index decreasing almost parabolically and radially outwardly toward the cladding. The diameter of the cylindrical lenses is chosen as the same as the optical fibers. The microchannels are formed so that all the optical fibers and the lenses placed in the microchannels can be aligned with each other in parallel manner or orthogonal manner.

A preferred method of the present invention for manufacturing the optical switch array includes the essential steps of selective formation and etching of oxidized porous silicon and anisotropic etching of (110) silicon substrates in KOH solution.

The (110) silicon substrate has four (111) crystal planes intersecting with its surface at an angle of 90 degree. In KOH etching, the etching rate for (111) crystal planes is much lower than the etching rate for other crystal planes. Because of these, a vertical planar plane can be formed in the (110) silicon substrate if the etch mask accurately orients to a (111) crystal plane to the proper crystal direction to minimize mask undercutting. The (111) silicon planar plate has two opposite (111) crystal planes that are atomic smooth and qualified for optical mirrors with very high quality.

Selective etching of a buried oxidized porous silicon layer is used to release the silicon strips from the (110) silicon substrate. Before etching of the oxidized porous silicon, four fabrication steps need to be carried out. The first step is to form a heavily doped layer in a lightly doped silicon substrate. The second step is to form a lightly doped epitaxial layer on the surface of the heavily doped layer. The third step is to oxidize the heavily doped layer to form an oxidized porous silicon layer. The fourth step is to remove the oxidized porous silicon layer in an etch solution used for silicon dioxide.

During the process for forming the (111) silicon planar plates, the oxidized porous silicon layer severs for an etching stop layer. Because of a small thickness of the (111) silicon planar plate, the openings of the etching mask have to align with the oxidized porous silicon layer precisely. When the etched bottom lowers down to the oxidized porous silicon layer the etch process stops automatically due to a very low etch rate for the oxidized porous silicon in the KOH solution. After removing the oxidized porous silicon layer the silicon layer beneath the oxidized porous silicon layer separates from the (110) silicon substrate and forms a flexural silicon strip.

The microchannels for holding the optical fibers and the cylindrical lenses are formed through deep reactive ion etching (DRIE).

As an alternative, the microchannels are also formed through anisotropic etching.

A method to form well-defined microchannels for holding optical fibers by etching of a (110) silicon substrate was described in U.S. Pat. No. 5,381,231. This U.S. patent was issued to the present inventor and has been incorporated here by reference of the present invention.

This method involves two fabrication steps. The first step is to form a plurality of cavity rows each cavity having side walls bounded by (111) crystal planes. An etching mask comprises a plurality of rhombic opening rows each opening having edges aligned with (111) crystal planes. Each row of rhombic openings comprises two different size rhombic openings that are alternatively disposed in a line. The second step is to remove very thin vertical walls formed between each two adjacent cavities by isotropic etching. After this fabrication step, each cavity row becomes a microchannel with two opposite zigzag side edges. This fabrication step also results in a plurality of ridge pairs disposed on the two opposite side walls of the microchannel. Each pair of ridges has a well-defined configuration. Particularly, the spacing between the two ridges can be precisely calculated.

DETAILED DESCRIPTION OF PREFERRED EMBODIMENTS

Figure 3:
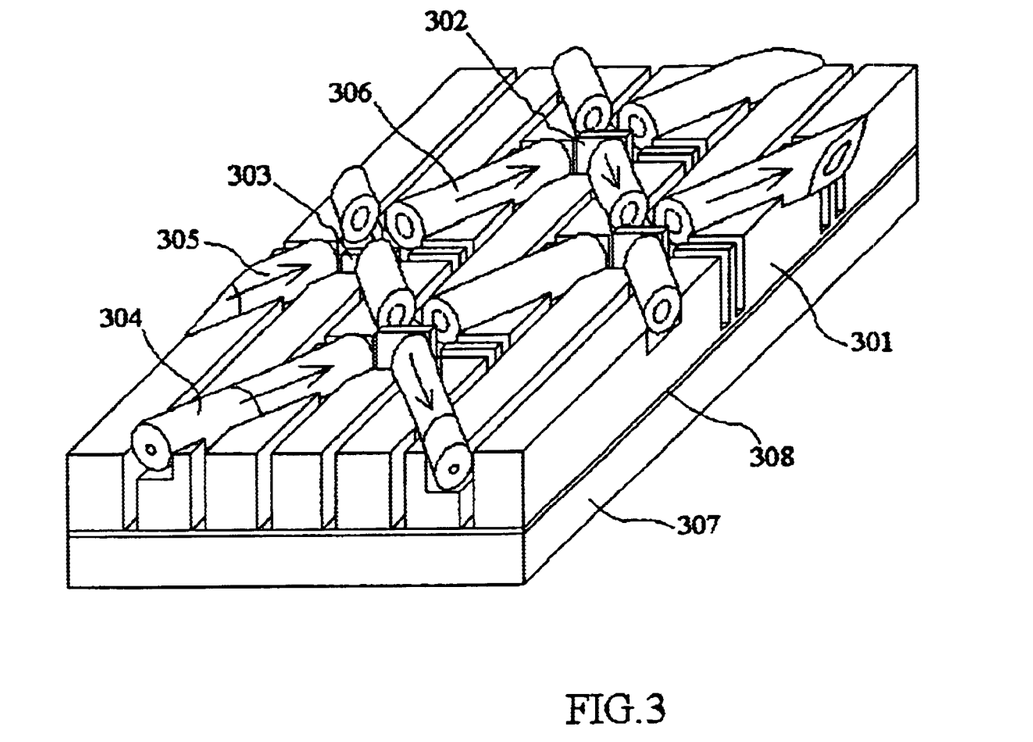
FIG. 3 is a partially cut away perspective view of an optical switch array developed by the present invention.

Referencing to FIG. 3, an optical switch array, in accordance with the present invention, comprises a (110) silicon substrate 301; a plurality of lifted (111) silicon planar plates 302 coated with a reflective layer on the two opposite surfaces; a plurality of hidden (111) silicon planar plates 303 coated with a reflective layer on the two opposite surfaces; a plurality of optical fibers 304 each with a cylindrical lens 305 bonded to an end facing a (111) silicon plate and each placed in a microchannel; a plurality of cylindrical lenses 306 each placed in a microchannel; a rigid plate 307 supporting the silicon substrate 301, and an adhesive layer 308 imposed between the silicon substrate 301 and the rigid plate 307.

As shown by the arrows disposed on the bottom of the FIG. 3, an optical beam coming out from a cylindrical lens bonded to an optical fiber is reflected by a lifted (111) silicon planar plate and enters an orthogonal cylindrical lens bonded to another optical fiber.

In general, an optical beam coming out from a first optical fiber can pass to any second optical fiber that is placed angularly with respect to the incoming optical beam.

As shown by the arrows disposed on the top of the FIG. 3, an optical beam coming out from a cylindrical lens bonded to an optical fiber is first reflected by a lifted (111) silicon planar plate and passes through an orthogonal cylindrical lens. Then the optical beam is reflected by another lifted (111) silicon planar plate and passes through another orthogonal cylindrical lens.

In general, an optical beam coming out from a first optical fiber can either pass to a second optical fiber aligned with the first fiber or to any second optical fiber that is placed angularly with respect to the first fiber.

Figure 4:
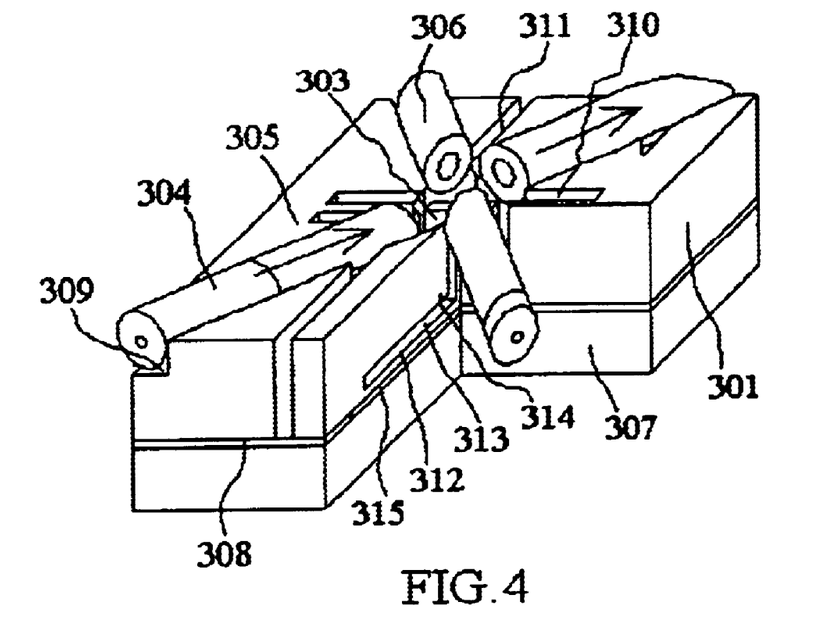
FIG. 4 is a partially cut away perspective view of an optical switch in non-reflective position in accordance with the present invention.
Figure 5:
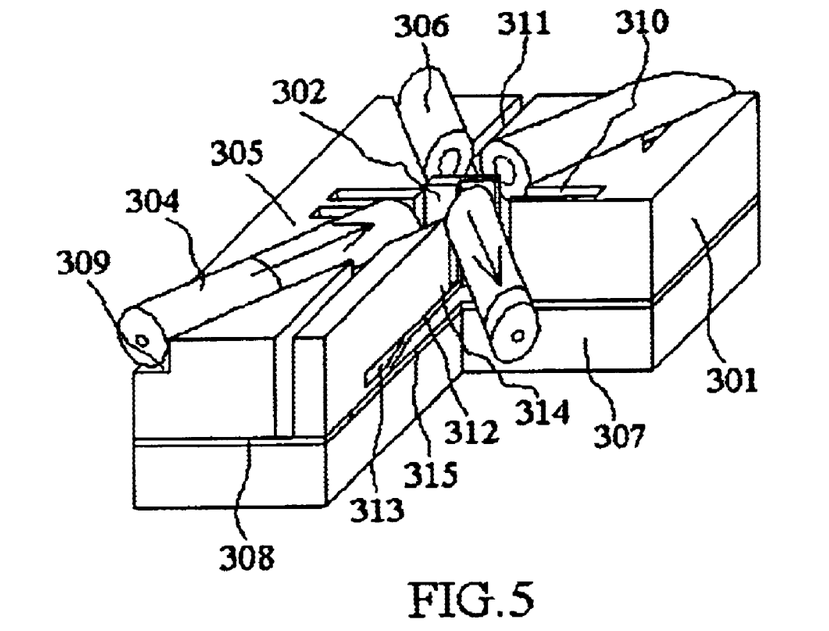
FIG. 5 is a partially cut away perspective view of an optical switch in reflective position in accordance with the present invention.

Referring to FIG. 4 and FIG. 5, each optical switch, in accordance with the present invention, uses a rectangular silicon strip 312 to support a (111) silicon planar plate 303. The rectangular silicon strip 312 is anchored to the (110) silicon substrate 301 at least at one short side. An air gap 313 separates the rectangular silicon strip 312 from the (110) silicon substrate 301. Two stop shoulders 314 suspend over the air gap 313 and dispose at the two opposite sides of the (111) silicon planar plate 303 respectively. Two deep trenches 311 cut down through the while (110) silicon substrate and separate the (111) silicon planar plate 303 from the (110) silicon substrate 301 at the two opposite long sides. The (111) silicon planar plate 303 may locate in a symmetrical plane of the silicon strip 312. When the (111) silicon planar plate 303 gets off vertical position it can restore in the vertical position automatically. The (111) silicon planar plate 303 also may locate in any position near one free end of the silicon strip 312. When the silicon strip 312 bends up to contact the stop shoulders 314, the end portion of the bent silicon strip can be smoothed out so that the vertical position of the (111) silicon planar plate 303 remains preserved.

The optical switch uses an electrostatic drive mechanism to force the (111) silicon planar plate to go into a reflective position, in accordance with the present invention. As shown in FIG. 4, the electrostatic drive mechanism comprises a plate capacitor with two plate electrodes. One plate electrode is made of the silicon strip 312 itself. Another plate electrode 314 attaches on the surface of the rigid plate 307. When a dc voltage applies to the two plate electrodes, a generated electrostatic force pushes the silicon strip 312 upwardly. The air gap allows the silicon strip 312 to bend up until it touches the stop shoulders 314. The bend of the silicon strip 317 lifts the (111) silicon planar plate 302 so that its protruding portion has a length larger than the ½ diameter of the core of the optical fiber. Note that when the (111) silicon planar plate 302 is bent up to contact the stop shoulders 314 the contacted portion still stays in a planar manner. Because of this, although the (111) silicon planar plate 302 gets a little tilt, it can be forced to return in the vertical position.

FIG. 4 shows a non-reflective position of the optical switch in which the (111) silicon planar plate 303 hides within the (110) silicon substrate. The upper edge of the (111) silicon planar plate 303 aligns with the surface of the (110) silicon substrate 301. The core of the optical fiber 304 and the cylindrical lens 305 are pre-positioned above the surface level of the (110) silicon substrate 301. An optical beam coming out of the cylindrical lens 305 bonded to the optical fiber 304 can travel over the (111) silicon planar plate 303 and enter the opposite cylindrical lens.

FIG. 5 shows a reflective position in which the lifted (111) silicon planar plate 302 reflects an optical beam coming out from a first cylindrical lens that extends to the reflective surface at an angle of 135 degree or makes an incident angle of 45 degree to the reflective surface. The reflected optical beam then enters a second cylindrical lens that is orthogonal to the first cylindrical lens.

As shown in FIG. 4 and FIG. 5, each cylindrical lens is placed in a microchannel. All the microchannels have the same depth and a similar inside configuration. This allows the cylindrical lenses to run at a same level and along a direction that orients to a (111) silicon planar plate at an angle of 135 degree or 45 degree.

FIG. 6 through FIG. 13 show a preferable sequential flow for fabricating the optical switch in accordance with the present invention.

Figure 6:
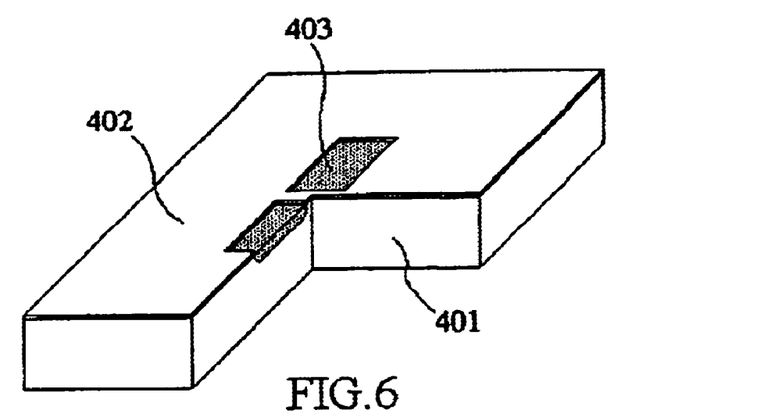
FIG. 6 to FIG. 13 are cross sectional views of an optical switch at different fabrication steps in accordance with the present invention.

Referring to FIG. 6, a two side polished, lightly doped (110) silicon substrate 401 is prepared. The silicon substrate may be n-type or p-type silicon with a resistivity ranging from 1 to 20 ohm-cm, typically 3 ohm-cm. A 1-micrometers-thick $SiO_2$ layer 402 thermally grows to cover the surface of the silicon substrate 401. A photolithography process creates a $SiO_2$ pattern for a subsequent ion implantation. The $SiO_2$ pattern contains a row of rectangular openings each having two opposite short sides aligned with a (111) crystal plane that is vertical to the surface of the (110) silicon substrate. Using the $SiO_2$ pattern as a protection mask, a heavily doped silicon layer 403 forms in the silicon substrate 401 in a two step process. The first step is to perform antimony ion implantation. The second step is to perform thermal drive-in. The processing conditions are optimized to obtain a heavily doped silicon layer 403 with a sheet resistance of 4 to 20 ohm/square, typically 8 ohm/square and a depth ranging from 10 to 20 micrometers, typically 15 micrometers.

Figure 7:
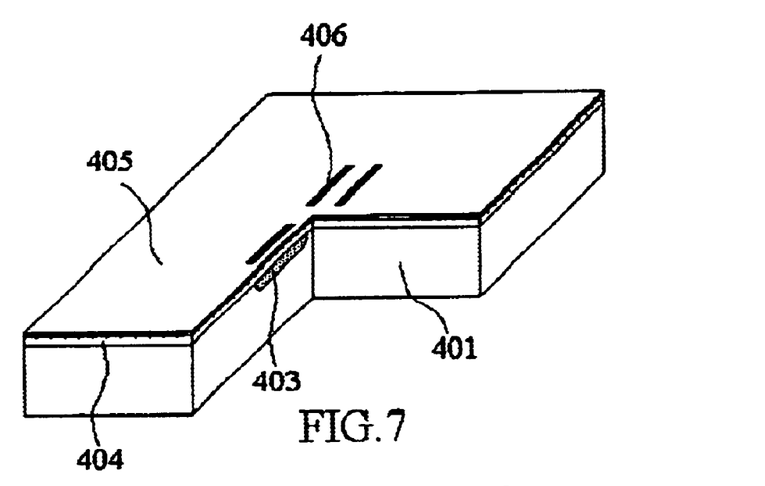

After removing the residual $SiO_2$ layer 402, a lightly doped n-type silicon epitaxial layer 404 is grown on the surface of the silicon substrate 401. The resistivity of the epitaxial layer 404 may be 1 to 20 ohm-cm, typically 3 ohm-cm. The thickness of the epitaxial layer 404 may be 2 to 20 micrometers, typically 5 micrometers. Thereafter a 2000-Anstrums-thick $Si_3N_4$ layer 405 coats the surface of the epitaxial layer 404. The $Si_3N_4$ layer 405 is preferably formed by low pressure chemical vapor deposition (LECVD) at 800 Centigrade degree, which results in a hard $Si_3N_4$ layer. A photolithography process creates a $Si_3N_4$ pattern. Using the $Si_3N_4$ pattern as a protection mask an ion reactive etching (RIE) process is carried out. This step produces trenches 406 extending down through both the $Si_3N_4$ layer 405 and the epitaxial layer 404 and finally reaching the buried heavily doped silicon layer 403, as shown in FIG. 7.

Retaining the $Si_3N_4$ pattern, an anodization process in a hydrofluoric acid (HF) solution converts the buried heavily doped silicon layer 403 into a porous silicon layer (not shown in the figures). The anodization process uses a double electrochemical cell in which contact to the backside of the (110) silicon substrate 401 through HF solution. Anodization conditions are compromised to obtain the porous silicon layer with a density of about 45% of bulk silicon. Anodization time is managed as short as possible both to minimize dissolution of the porous silicon in HF solution and to improve equipment utilization. To this end, the concentration of HF solution is set to be 40 wt % and the local current density in the anodizing region is set to be 35 $mA/cm^2$.

Figure 8:
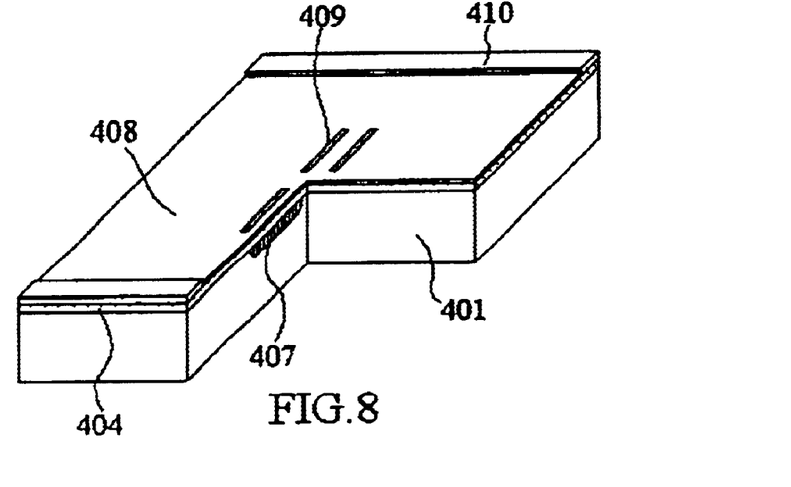

In a following step, a thermal treatment process in an oxidizing ambient such a dry $O_2$ turns the porous silicon layer into a compact oxidized porous silicon layer 407, as shown in FIG. 8. The oxidized porous silicon layer 407 is required to have chemical inertness, high mechanical stability and $SiO_2$ thermal insulating properties. Oxidization of the porous silicon layer can proceed within the whole thickness range at the same time. This allows the formation of an oxidized porous silicon layer 407 in a reduced amount of time. The oxidization process divides into three steps. The first step is to grow a few oxide monolayers on the internal surface of the porous silicon layer in dry $O_2$ at 450 Centigrade degree. These oxide monolayers can avoid porous silicon coarsening during the process of a subsequent high temperature treatment. The second step is to turn the porous silicon layer into an oxidized porous silicon layer 407 at 850 Centigrade degree in wet $O_2$. The resultant oxidized porous silicon layer 407 still maintains a certain amount of porosity, which causes a high dissolution rate of the porous silicon layer in a HF solution. The third step is to thermally densify the oxidized porous silicon layer 407. Densification of the oxidized porous silicon layer 407 is obtained by the occurrence of the viscous flow of silica. A thermal treatment is conducted at 1100 Centigrade degree in ambient wet $O_2$ for 30 minutes. After densification, the oxidized porous silicon layer 407 transforms into a layer with characteristics similar to the $SiO_2$ grown on a planar silicon surface.

Next, a 3000-Anstrums-thick $Si_3N_4$ layer is deposited by LPCVD to form filled trenches 409 and a coating layer 408. The $Si_3N_4$ layer on the inside surface of the filled trenches 409 will be used to protect the underlying layer during a sequence etching process for removing the oxidized porous silicon layer 407. A photolithography process creates windows in the $Si_3N_4$ layer. The windows are filled with a 4000-Anstrums-thick gold layer by a lift-off process. The thickness of the gold layer increases to form 2-micrometers-height bumps 410 by electroplating. After annealing at 350 Centigrade degree in dry $N_2$ for 30 minutes, the bumps 410 make good ohmic contact with the (110) silicon substrate 401.

Figure 9:
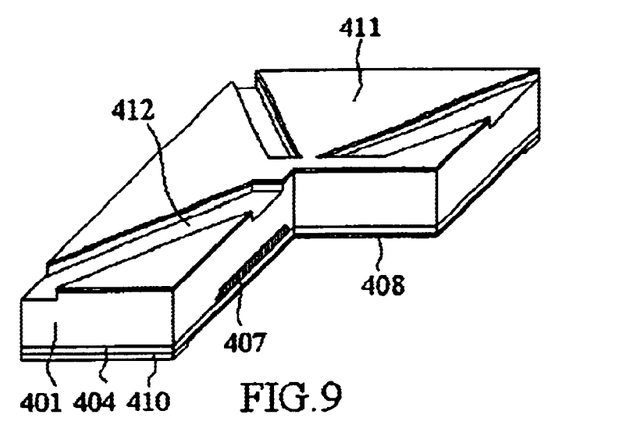

Turning to FIG. 9, the (110) silicon substrate 401 is now inverted so that the epitaxial layer 404 is the reverse side, instead of the obverse side. A 1-micrometers-thick $SiO_2$ layer 411 is deposited on the obverse surface of the silicon substrate 401 by LPCVD. The $SiO_2$ layer 411 is patterned by a photolithography process. The resulted $SiO_2$ pattern comprises two rhombic opening rows. The two opposite short sides of the rhombic openings of the two opening rows are aligned with a same (111) crystal plane that is vertical to the surface of the (110) silicon substrate. The longitudinal axis of the first opening row is oriented to the same (111) crystal plane at an angle of 135-degree. The longitudinal axis of the second opening row is oriented to the same (111) crystal plane at an angle of 45-degree. The two longitudinal axes of the two opening rows are orthogonal to each other. Two adjacent openings of a same opening row are spaced end-by-end.

Under the protection of the patterned $SiO_2$ pattern, a deep reactive ion etching (DRIE) process creates a plurality of microchannels 412. The DRIE process uses an etcher based on an inductively coupled plasma (ICP). Such an etcher can run a side wall passivation scheme: Ion impact onto the side walls is weak in reactive ion etching and a passivating film preventing isotropic etching can build up there, while the bottom is subject to strong ion impact breaking through any passivating film formation. The etching conditions are optimized to obtain approximately 63 micrometers-deep and 62.5-micrometers-width microchannels 412 with a nearly vertical profile.

In a succeeding step, another 1-micrometers-thick $SiO_2$ layer (not shown in the figures) grows on the surface of the (110) silicon substrate 401 by LPCVD. The new $SiO_2$ layer also coats the inside surface of the microchannels 412. Then a photolithography process creates a fan-shaped $SiO_2$ pattern. For fabrication of high-aspect-ratio features with optical-quality surfaces by anisotropic etching of (110) silicon, precise alignment of the features to the (111) crystal planes is of critical importance. A simple way to determine the direction of the (111) crystal planes to within 0.1 degree is by using a fan-shaped alignment target pattern consisting of 3 millimeters long, 100 micrometers deep, and 10 micrometers wide trenches which fan out at 0.1 degree angles to one another and span from –2 degrees to 2 degrees were used. The direction of the (111) crystal planes to within 0.1 degree could be determined by examining the angle for which minimum underetching took place.

With the fan-shaped pattern used as a protection mask, an isotropic etching process progresses. The anisotropic solution contains 40 wt % KOH and is maintained at 70 Centigrade degree.

Figure 10:
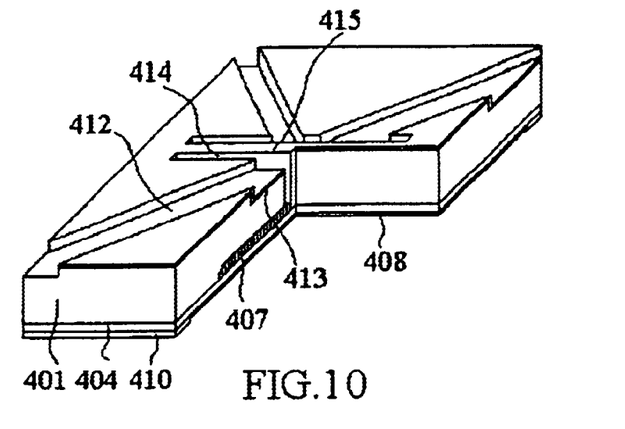

Following the fan-shaped trenches, another LPCVD $SiO_2$ layer 413 is deposited. Thereafter, a photolithography process proceeds to create another $SiO_2$ pattern using the fan-shaped trenches as an alignment mark. The $SiO_2$ pattern comprises a plurality of rectangular opening pairs. The two rectangular openings of each pair are parallel to each other and spaced with a small distance. The outer long opposite sides of the two rectangular openings of each pair are one by two aligned with the corresponding end vertical side walls of the microchannels 412 which are made of the (111) crystal planes vertical to the surface of the (110) silicon substrate. The length of the long opposite sides of the rectangular openings is 200 to 500 micrometers, typically 300 micrometers and the length of the short opposite sides of the rectangular openings is 10 to 50 micrometers, typically 20 micrometers. The small distance between the two rectangular openings is 2 to 50 micrometers, typically 10 micrometers.

Note that the small distance between the two rectangular openings will determine the thickness of the (111) silicon planar plate to be formed in a subsequent step. Therefore, the two inner long sides of the two rectangular openings of each pair have to be precisely aligned one by one with the two inner short sides of the underlying two adjacent oxidized porous silicon layers 407.

The etching process proceeds through most the entire thickness of the (110) silicon substrate and then automatically stops at the underlying oxidized porous silicon layers 407. After etching, two parallel etched vertical trenches 414 with a width of about 20 micrometers and a connected vertical planar plate 415 with a thickness of about 10 micrometers are formed, as shown in FIG. 10. Note that the vertical planar plate 415 connects with the (110) silicon substrate 401 at two opposite short sides.

To make the connected vertical planar plates 415 into reflecting mirrors, a 3000-Angstroms-thick gold layer is sputtered on the two opposite surfaces of the connected vertical planar plates 415. During the sputtering process, the (110) silicon substrate 401 is inclined so that the upper portion of the formed gold layer is uniform in thickness.

Figure 11:
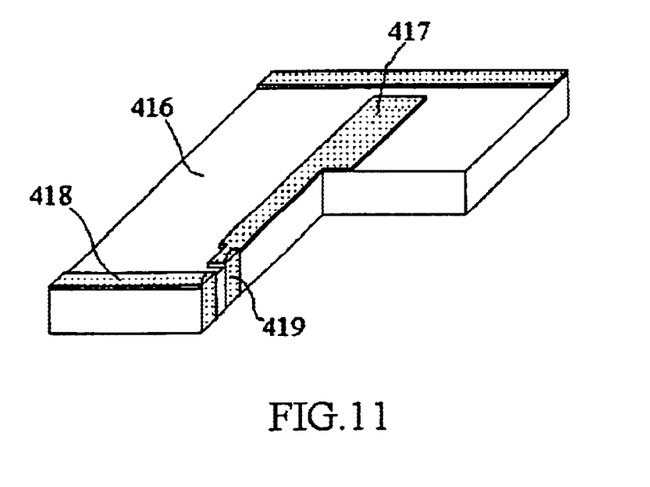

A next step is to prepare a rigid plate such as an $Al_2O_3$ plate 416 with conductive paste filled through holes 419. After thoroughly cleaning, a 3000-Angstroms-thick gold layer is sputtered on the surface of the plate 416. A photolithography process follows to form electrodes 417 and 418 thereon. The thickness of the electrodes 417 and 418 increase to 2 micrometers by electroplating. The electrodes 417 and 418 may be connected to a printed circuit on the back surface of the $Al_2O_3$ plate 416 through the conductive paste filled through holes 419.

Figure 12:
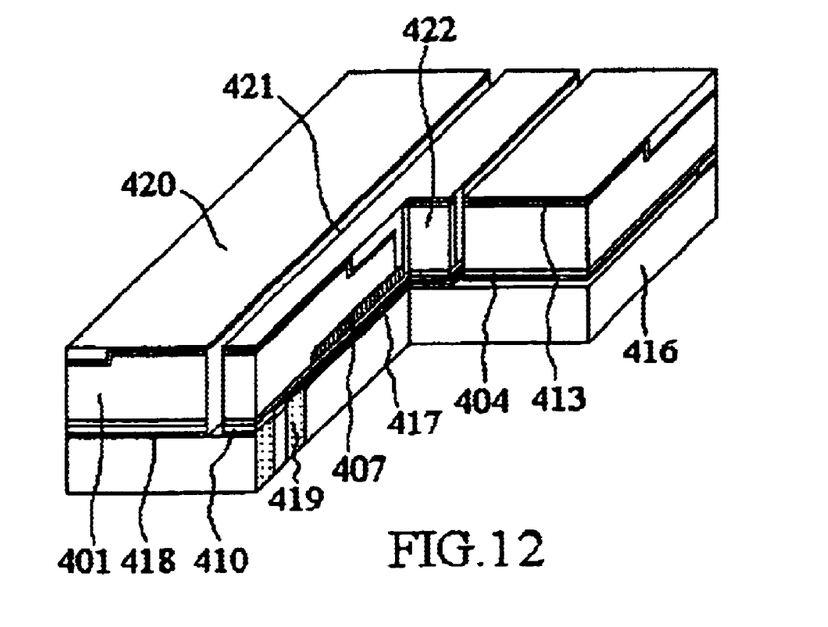

The (110) silicon substrate 401 is now mounted on the surface of the rigid plate 416 by bonding the gold bumps 410 and the corresponding electrode 418 together. Then the connected vertical trenches 414 and the microchannels 412 are filled with photoresist 420. It is preferable to use an electrodeposited photoresist such as Eagle ED 2100 or PEPR 2400. The electrodeposited photoresist contains small colloidal particles that can migrate toward and coat an electrode when an electric field is applied. Before applying the electrodeposited photoresist, a 3000-Angstrom-thick Aluminum layer is deposited on the inner surface of the vertical trenches 414 and the microchannels 412 by electron beam evaporation. The Aluminum layer serves as a seed layer during the deposition of the photoresist. A dicing saw is used to cut the (110) silicon substrate to form cut trenches 421. The cut trenches 421 extend down through the (110) silicon substrate and reach the surface of the rigid plate 416. This step produces (111) silicon planar plates 422 that are laterally separated from the (111) silicon substrate 401 at the two opposite short sides, as shown in FIG. 12.

Figure 13:
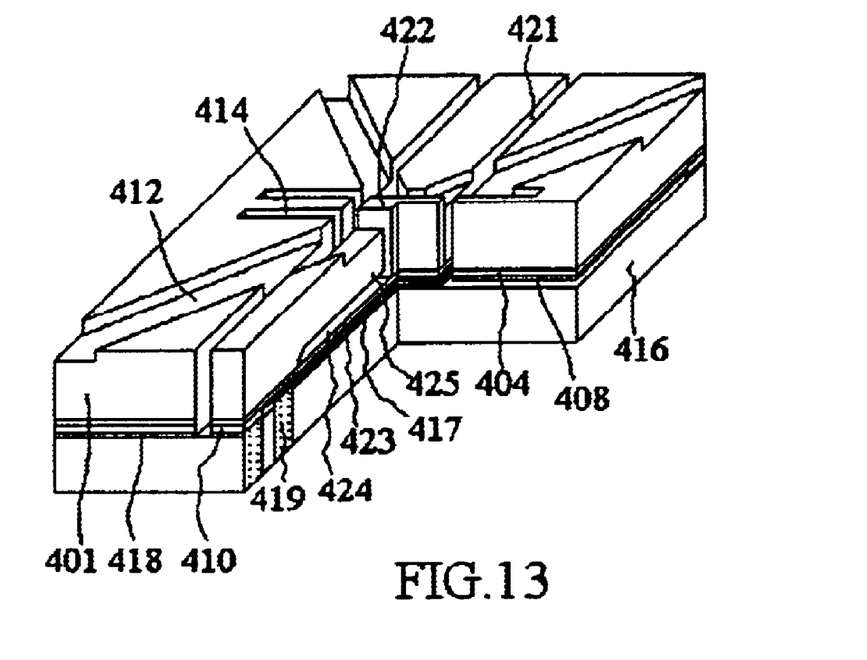

After the dicing saw cutting, the electrodeposited photoresist layer 420 is removed in acetone and the Aluminum layer is removed in $H_3PO_4:CH_3COOH:HNO_3$ (29:5:1) solution at Centigrade degree. A following step is to remove the oxidized porous silicon layer 407 using a diluted HF solution such as a buffered HF solution. This step results in a silicon strip 423, an air gap 424 and two stop shoulders 425. As shown in FIG. 13, the silicon strip 423 supports the (111) silicon planar plate 422 in the central symmetrical plane. The two opposite long sides of the silicon strip 423 are separated from the (110) silicon substrate 401 completely. The two opposite short sides of the silicon strip 423 are connected with the (110) silicon substrate 401.

Note that the (111) silicon planar plate 422 may not be located in the central symmetrical plane of the silicon strip 423. In general, the (111) silicon planar plate 422 may be located in any position of the silicon strip 423, but it must keep a certain distance from the anchored side(s) of the (111) silicon planar plate 422 so that a certain deflection of the silicon strip can be generated for lifting the (111) silicon planar plate out of the (110) silicon substrate 401. The (111) silicon planar plate 422 may be anchored to the (110) silicon substrate 401 at the one short side, instead of the two short sides. The only requirement is that the anchored side(s) must have enough mechanical strength to support the (111) silicon planar plate 422.

The lower surfaces of the stop shoulders 425 are formed by removing the oxidized porous silicon layer 407. The oxidized porous silicon layer 407 is converted by a planar buried heavily doped layer 403. Therefore, the lower surfaces of the stop shoulders 425 are in planar manner and parallel to the surface of the (110) silicon substrate 401. When the silicon stripe 423 bends up, the central portion of the silicon strip 423 becomes curved. Because of this, the (111) silicon planar plane 422 may be off the vertical position if it does not precisely locate in the central symmetrical plane. Nevertheless, as long as the silicon strip 423 bends up to touch the lower surfaces of the stop shoulders 425, the central portion can be forced to smooth out. Accordingly, the (111) silicon planar plate 422 can be remained in the vertical position.

Figure 14:
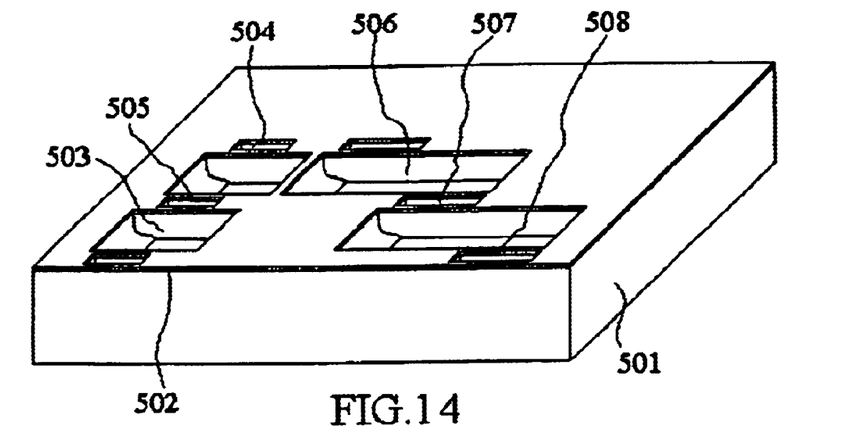
FIG. 14 is a perspective view of two cavity rows each row having large cavities and small cavities alternatively disposed, each cavity having two opposite parallel vertical walls, each two adjacent cavities having a small distance and all cavities formed by anisotropic etching of a (110) silicon substrate in accordance with the present invention.

Alternatively, the above-mentioned microchannels are formed by anisotropic etching. The microchannel forming process includes two steps. As shown in FIG. 14, the first step is to form a plurality of cavity rows comprising large cavities, such as 503 and 506, and small cavities such as 504 and 507 in a (110) silicon substrate 501 coated with a $SiO_2$ layer 502. In each row, the large cavities and the small cavities are disposed alternatively. The larger cavities have a lateral side length ranging from 300 to 1000 micrometers, typically 500 micrometers, and a longitudinal side length ranging from 300 to 600 micrometers, typically 400 micrometers. The small cavities have a longitudinal side length ranging from 50 to 100 micrometers, typically 50 micrometers. If the diameter of the optical fibers or the cylindrical lenses both to be placed in the microchannels is known, the lateral side length of the small cavities matching the optical fibers or the cylindrical lenses can be calculated according to a simple geometric relationship.

To form the cavity rows, an etch mask $SiO_2$ pattern is created to have corresponding rhombic opening rows. Each edge of the rhombic openings aligns with a (111) crystal plane vertical to the surface of the (110) silicon substrate. As well known, a (110) oriented silicon substrate has four (111) crystal planes intersecting the (110) surface at an angle of 90 degree and these (111) crystal planes make 70.5 degree or 109.5 degree to each other. Therefore, the resultant cavities have a six sided structure in which there are four (111) crystal planes vertical to the (110) surface and two (111) crystal planes making an angle of 35.3 degree to the (110) surface.

The anisotropic etching still uses a 40 wt % KOH solution maintained at 70 Centigrade degree. The resulted etch rate of (110) crystal plane is about 0.8 micrometers/minute. The depth of the etched cavities is controlled by counting the etch time.

FIG. 14 shows two cavity rows. Each cavity row has large cavities and small cavities alternatively disposed. The two adjacent cavities in a cavity row are spaced by a very thin vertical wall, such as vertical walls 505 and 508. The thickness of the thin vertical walls may be 1 to 5 micrometers, typically 2 micrometers. In the first row, all the small cavities 504 have a common longitudinal axis that is oriented to the end vertical side wall at an angle of 135 degree. In the second row, all the small cavities 507 have a common longitudinal axis that is oriented to the end vertical side wall at an angle of 45 degree. The longitudinal axes of these two rows are orthogonal to each other. Additionally, all large cavities such as cavities 503 and 506 are wider than their adjacent small cavities so that the widths of the formed thin vertical walls equal to that of the small cavities.

Figure 15:
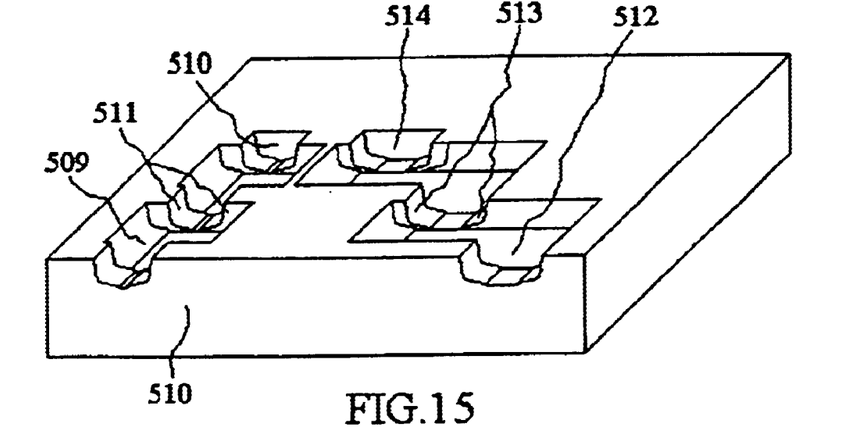
FIG. 15 is a perspective view of the two above-mentioned microchannels having two opposite sides in zigzag shape, an end side wall aligned with a (111) crystal plane vertical to the surface of the (110) silicon substrate and a longitudinal axes perpendicular to each other.

As shown in FIG. 15, the second step is to remove the vertical walls such as vertical walls 505 and 508 by isotropic etching. This step results in microchannels such as 509 and 512 and a plurality of ridge pairs such as 511 and 513 on the two opposite side walls of the microchannels. The configuration of the ridges such as 511 and 513 needs to be optimized so that the optical fibers and the cylindrical lenses can be placed into the microchannels in a mating manner. This can be done by adjusting the lateral side length of the small rhombic openings. Suppose that the diameter of the optical fibers or the cylindrical lenses is 125 micrometers, the longitudinal side length of the small rhombic openings is 50 micrometers and the thickness of the etched layer by isotropic etching is 2 micrometers. The lateral side length of the small rhombic openings can be calculated to be 203.2 micrometers for the small rhombic openings with the longitudinal axes making an angle of 135 degree to the end trace of the (111) crystal plane at the surface of the (110) silicon substrate. In similar manner, the lateral side length of the small rhombic openings can be calculated to be 236.6 micrometers for the small rhombic openings with the longitudinal axes making an angle of 45 degree to the end trace of the (111) silicon crystal plane at the surface of the (110) silicon substrate.

Figure 16:
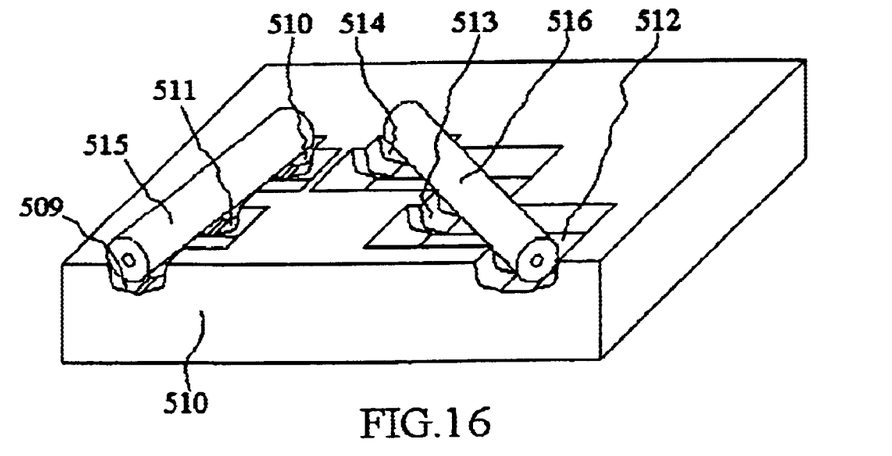
FIG. 16 is a perspective view of two optical fibers each placed in a microchannel and having an extending line parallel to the longitudinal axis of the microchannel.

Referencing now to FIG. 16, an optical fiber 515 with a cylindrical lens bonded on the proximate end is placed in a microchannel 509. The microchannel 509 extends to the end vertical side wall 510 of the microchannel 509 at an angle of 135 degree. Another optical fiber 516 with a cylindrical lens bonded on the proximate end is placed in the microchannel 512. This microchannel extends to the end vertical side wall 514 of the microchannel 512 at an angle of 45 degree. The two optical fibers 515 and 516 are perpendicular to each other and their extending lines meet at a point behind the end vertical side walls 510 and 514.

Although the present invention has been described in connection with specific exemplary embodiments, it should be appreciated that modifications or changes may be made to the embodiments of the present invention without departing from the inventive concepts contained herein.

What is claimed is:

1. A method for fabricating an optical switch array comprising of the steps:
    providing a two side polished lightly doped (110) silicon substrate;
    forming a heavily doped layer with a same type impurity as the (110) silicon substrate on the back side of the (110) silicon substrate;
    growing a lightly doped epitaxial layer on the back side of the (110) silicon substrate;
    converting the heavily doped layer into a porous silicon layer by anodization in HF solution;
    forming a plurality of microchannels on the front side of the (110) silicon substrate so that each makes a 135 or 45 degree angle to a (111) crystal plane vertical to the surface of the (110) silicon substrate;
    converting the porous silicon layer into an oxidized porous silicon layer by thermal oxidization;
    forming electrical interconnections on the front side of the (110) silicon substrate;
    forming a plurality of (111) silicon planar plates each having two opposite sides made of (111) silicon crystal planes on the front side of the (110) silicon substrate by anisotropic etching;
    coating the two opposite surfaces of the (111) silicon planar plates with a reflection layer;
    removing the oxidized porous silicon by etching in a diluted HF solution to form a plurality of silicon stripes;
    filling said microchannels and the trenches formed in the etching process with photoresist;
    bonding a rigid plate to the (110) silicon substrate at the back side; and
    cutting the (110) silicon substrate by a dicing saw machine so that each (111) silicon planar plate and its supporting silicon strip are laterally separated from the (110) silicon substrate completely.

2. A method for fabricating an optical switch array according to claim 1 wherein said lightly doped silicon substrate has a resistivity ranging from 1 to 20 ohm-cm.

3. A method for fabricating an optical switch array according to claim 1 wherein said lightly doped epitaxial layer has a resistivity ranging from 1 to 20 ohm-cm.

4. A method for fabricating an optical switch array according to claim 1 wherein said heavily doped layer has a sheet resistivity ranging from 4 to 20 ohm/square.

5. A method for fabricating an optical switch array according to claim 1 wherein said heavily doped layer has a thickness ranging from 10 to 20 micrometers.

6. A method for fabricating an optical switch array according to claim 1 wherein said lightly doped epitaxial layer has a thickness ranging from 2 to 20 micrometers.

7. A method for fabricating an optical switch array according to claim 1 wherein said (111) silicon planar plate has a thickness ranging from 2 to 50 micrometers.

8. A method for fabricating an optical switch array according to claim 1 wherein said microchannels are formed by deep reactive ion etching.

9. A method for fabricating an optical switch array according to claim 1 wherein said microchannels are formed by combination of anisotropic etching and isotropic etching.

* * * * *

UNITED STATES PATENT AND TRADEMARK OFFICE
CERTIFICATE OF CORRECTION

| | | |
|---|---|---|
| PATENT NO. | : 6,773,942 B2 | |
| DATED | : August 10, 2004 | |
| INVENTOR(S) | : Xiang Zheng Tu | |

It is certified that error appears in the above-identified patent and that said Letters Patent is hereby corrected as shown below:

<u>Column 10,</u>
Line 4, before the words "Centigrade degree" insert the number -- 40 --

Signed and Sealed this

First Day of February, 2005

JON W. DUDAS
*Director of the United States Patent and Trademark Office*